United States Patent [19]
Freebairn et al.

[11] 3,951,610
[45] Apr. 20, 1976

[54] GAS GENERATING APPARATUS
[75] Inventors: Hugh T. Freebairn; Mark H. Cohen, both of Houston, Tex.
[73] Assignee: Catalytic Generators, Inc., Chesapeake, Va.
[22] Filed: Feb. 1, 1974
[21] Appl. No.: 438,774

[52] U.S. Cl. ............................. 23/281; 23/288 R; 23/288 J; 219/497; 260/682; 426/263; 48/118.5
[51] Int. Cl.² ............................................. B01J 7/00
[58] Field of Search .................. 23/282, 281, 288 R, 23/288 J; 48/118.5; 260/682; 219/497; 426/257, 253, 263

[56] References Cited
UNITED STATES PATENTS

| 1,881,563 | 10/1932 | Held et al. ......................... 23/288 J |
| 1,913,938 | 6/1933 | Metzger et al. ..................... 260/682 |
| 3,451,782 | 6/1969 | Jenson ................................ 23/281 |
| 3,553,429 | 1/1971 | Nelson .............................. 219/497 |
| 3,652,699 | 3/1972 | Soderquist et al. ................ 23/288 J |
| 3,803,385 | 4/1974 | Saudorf ............................. 219/497 |

*Primary Examiner*—James H. Tayman, Jr.
*Attorney, Agent, or Firm*—Francis A. Keegan

[57] ABSTRACT

A portable olefin gas generating apparatus such as for generating ethylene to initiate the ripening of various climateric fruits. A reaction liquid is fed by gravity to a reaction chamber where it is catalytically converted into the desired olefin gas.

The reaction liquid includes an alcohol such as ethanol, a denaturing agent such as a ketone, an ester of a monocarboxylic acid, gasoline or gum rubber and a catalyst activating agent such as an ester of monocarboxylic acid, a straight chain hydrocarbon or an aromatic hydrocarbon.

To control the temperature of the gas generator apparatus an electronic temperature controller circuit is used in the reaction chamber.

20 Claims, 7 Drawing Figures

U.S. Patent April 20, 1976 Sheet 1 of 3 3,951,610
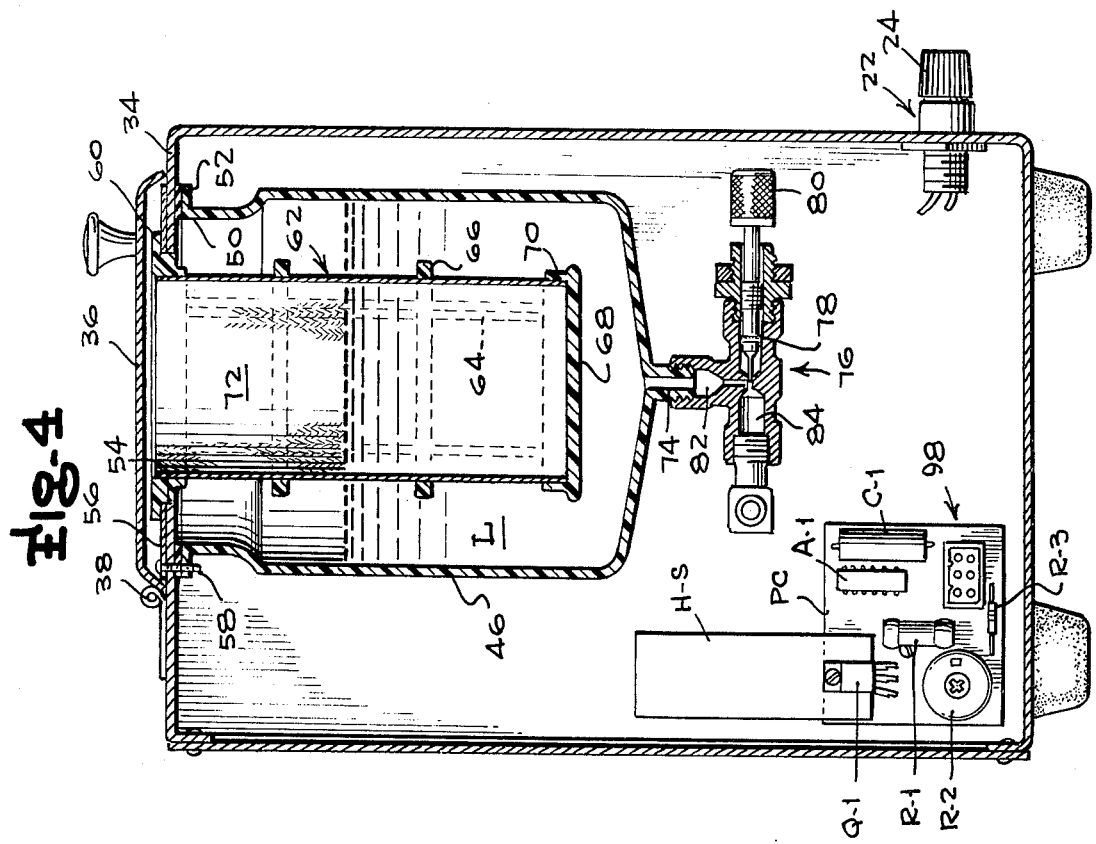
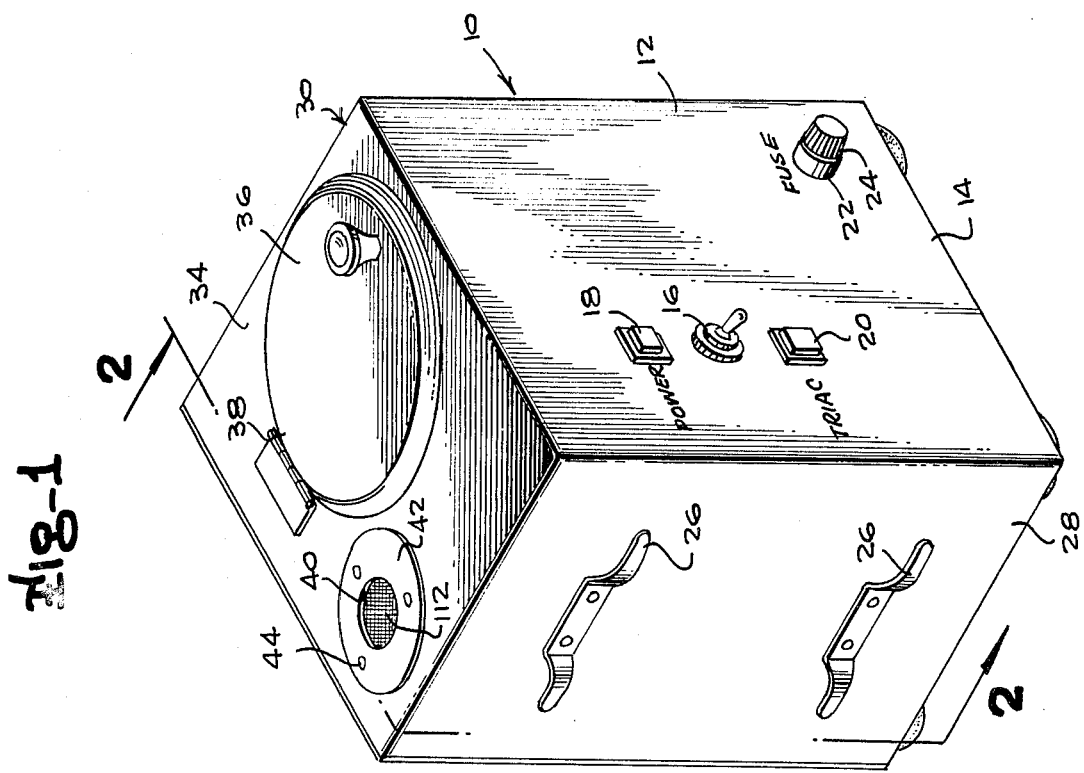

GAS GENERATING APPARATUS

BACKGROUND OF THE INVENTION

It is the present commercial practice to supply most normally gaseous materials in a compressed form contained in a steel cylinder. This is particularly true of the flammable and explosive gases such as ethylene and other olefinic gases. The cumbersome and unwieldy steel cylinders pose problems other than that which is obvious by reason of their weight. Cost and the requirement for storage of the tanks have plagued the user who has had no available alternative.

The problem of supplying ethylene in convenient form is particularly a problem in the fruit industry wherein ethylene is used to assist in the ripening of fruits for the commercial market. Ethylene gas is well known to be used to initiate the ripening of various fruits such as bananas, tomatoes, honeydews, pears, avocados as well as degreen citrus fruits such as oranges, lemons as well as being used in the fields of tomato and pecan groves for example.

Ethylene is also used in oxyethylene welding and cutting of various metals which again requires the containment of the ehtylene in steel cylinders.

SUMMARY OF THE INVENTION

This invention relates to a gas generating apparatus and a liquid composition therefore which produces olefinic gases such as ethylene. The gas generator apparatus includes a liquid reservoir within a housing and an outlet from the reservoir to permit gravity flow of the contained liquid into the bottom of a reaction vessel having an outer jacket and an inner heating element which together form a reaction chamber. The reaction chamber contains a suitable catalyst such as alumina which causes the catalytic conversion of the vaporized liquid into the desired gas.

A liquid composition for catalytic conversion to an olefin such as ethylene comprising: an alcohol such as ethanol, a denaturing agent such as a ketone, an ester of a monocarboxylic acid, gasoline or gum rubber and a catalyst activating agent such as an ester of a monocarboxylic acid, a straight chain hydrocarbon or an aromatic hydrcarbon.

To control the temperature of the gas generator apparatus an electronic temperature controller circuit is used in the reaction chamber.

OBJECTS OF THE PRESENT INVENTION

The present invention has for an object the provision of a gas generator apparatus for the production of various olefinic gases such as ethylene.

This invention also has as an object the provision of a liquid composition for the catalytic conversion to ethylene.

Another object of the present invention is the provision of an electronic temperature controller circuit to automatically control the temperature in the reaction chamber of the gas apparatus.

Another object of the present invention is the provision in the gas generating apparatus of a gravity feed liquid reservoir to supply reaction liquid for conversion into the desired gas by a suitable catalyst in a reaction chamber.

A more broadly stated object of the present invention is the provision of gas generating apparatus, liquid composition and electronic temperature controller to permit the generation of the desired gas at any convenient location without the requirement of storing pressurized gas in the conventional steel cylinders.

These and other objects of the present invention will be apparent upon consideration of the following specification, claims and drawings.

THE DRAWINGS

FIG. 1 is a perspective view of the gas generating apparatus illustrating the gas outlet and the cover for the liquid inlet as well as the control panel.

FIG. 4 is a cross-sectional view taken along lines 4—4 of FIG. 3 illustrating the liquid metering means.

DESCRIPTION OF THE PREFERRED EMBODIMENT

The Gas Generating Apparatus

Figure 3:
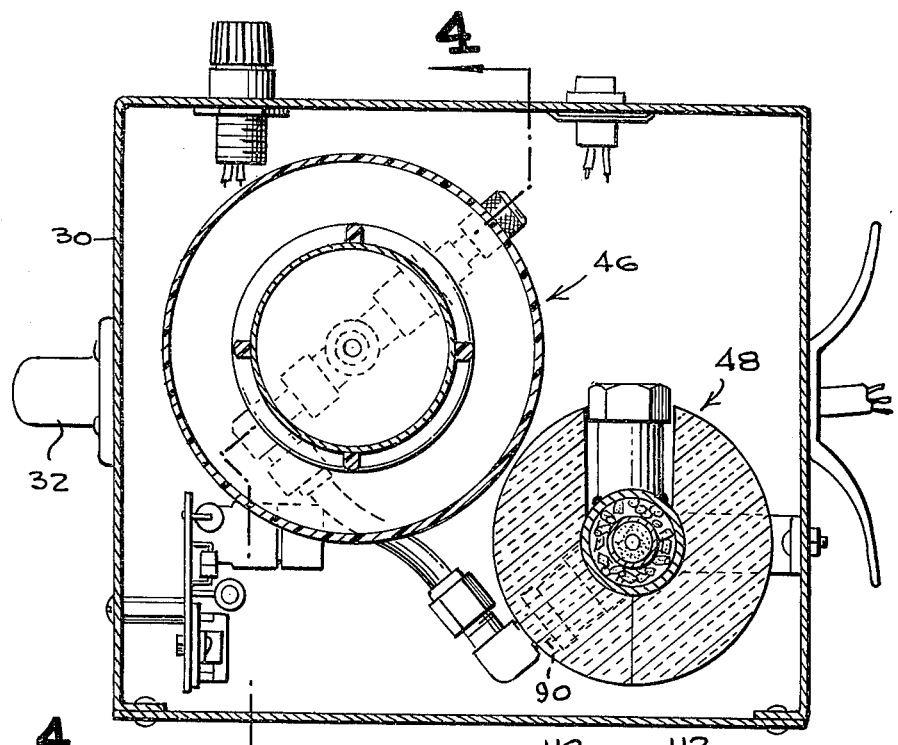
FIG. 3 is a cross-sectional view taken along lines 3—3 of FIG. 2.
Figure 2:
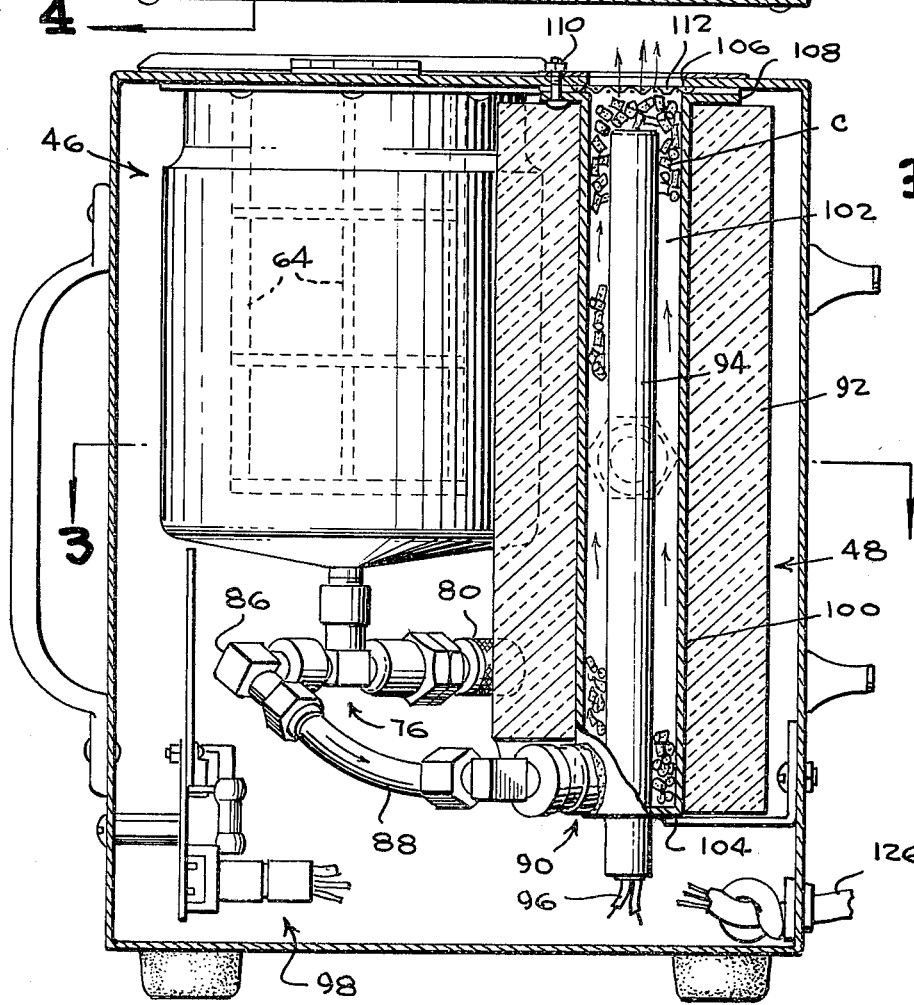
FIG. 2 is a cross-sectional taken along lines 2—2 of FIG. 1 illustrating the internal design of the reaction vessel.

In FIG. 1 there is shown the gas generator apparatus of the present invention depicted generally by the numeral 10. The gas generator includes a housing 12 which is provided with a front panel 14 containing a conventional power switch 16 and suitable indicator lights such as power light 18 and triac light 20, a conventional fuse tube 22 is also provided having a removable cap 24 for access to the fuse. Electrical cord hooks 26 are provided on an adjacent side panel 28. On the opposite side panel 30 as may be best seen from FIG. 3 is a suitable handle 32 to permit easy portability of the entire gas generator apparatus. The feature of portability and the ease with which the gas generator apparatus may be moved from place to place is intended to be contrasted with the cumbersome and weighty conventional steel cylinders for supplying the desired gas in the usual compressed state.

On the top panel 34 of the housing 12 there is provided a cover 36 hinged at 38 and a gas outlet 40. The gas outlet 40 is surrounded by a plastic guard 42 held in place by suitable securing means such as screws 44.

Within the housing 12 there is positioned the liquid reservoir 46 and the reaction vessel 48. The liquid reservoir or supply source means is formed from any liquid impervious material such as metal or a plastic such as polyethylene and is provided with a mouth 50 and a lip 52 held against the underside of the top panel 34. An access port 54 is provided in the panel and is protected by the cover 36. Surrounding the opening of the access port 54 is a metal support ring 56 through which suitable securing means such as screws 58 are passed to secure the lip 52 and therefore the reservoir to the top panel 34. Supported on the edge of the support ring 56 by flange 60 and received into the access port 54 is a cylindrical cage 62 formed by a plurality of vertical rods 64 held together by a plurality of vertically arranged hoops 66. The cage 62 has a disc shaped base 68 and an upstanding rim 70 near the outer periphery of the base to support the rods 64 in place.

Retained within the cage 62 is a filter 72 which filters the liquid L poured into the cage through the access port 54. This filter is preferably made of polypropylene and is capable of screening out greater than 5 micron particles. All liquid L must pass through the filter 72 before being permitted to flow out from the liquid reservoir 46. At the bottom of the liquid reservoir 46 is liquid outlet 74 to which is threadedly engaged a T nipple 76 having a needle valve 78 controlled by knob 80. The flow from reservoir port 82 through outlet port 84 is preferably such as to permit approximately 90 ml/hr + or − about 30 ml per hour. Suitable connection to the outlet port 84 includes elbow 86 and plastic tubing 88 preferably Teflon, capable of withstanding high temperatures that may be encountered within housing. The metered liquid L is carried into the inlet 90 of the reaction vessel 48 by gravity due to the superposition of the outlet part 84 to the inlet 90.

The reaction vessel 48 is thermally insulated by a hollow cylindrical insulation which preferably may be a calcium — silicate thermalbestos insulation of approximately 1 inch thickness.

The reaction vessel 48 includes an electrically heated element 94 of conventional design. The electrical current is transmitted by electrical conduits 96 controlled by the heat regulating circuit or controller 98. The heating element 94 is preferably cylindrical in shape and extends approximately 8 inches in length from the junction of the electrical conduits 96 to the top. The heating element 94 is preferably capable of a power output of 160 watts with a wattage distribution of $P = 40 - 5X$ where X is the distance in inches along the heating element beginning at the junction of the electrical conduits 96. It is preferred though not essential that the heating element 94 begin with a power of 40 watts and decrease along the length upwardly with a graphic slope or gradient of −5.

The heating element 94 is housed within an outer jacket 100 which may be formed from stainless steel or other suitable temperature resistant material. The jacket is concentric to the heating element 94 and forms an annulus or reaction chamber 102 between the internal surface of the outer jacket 100 and the exterior surface of the heating element 94. The jacket 100 is closed at the lower end 104 and open at the upper end 106 to communicate with the gas outlet 40. The outer jacket 100 is provided with a flange 108 which is secured as by screws 110 to the top panel 34. A screen 112 is positioned between the flange 108 and the underside of the top panel 34, the purpose of which is to retain the catalyst C within the reaction chamber 102.

The catalyst C is preferably in activated gamma alumina catalyst which is useful for the generation of ethylene by dehydration of the ethanol. Other suitable catalysts would be useful if other olefins were to be generated. Based upon the use of an alumina catalyst it is preferably that the catalyst be peletized into small cylindrical shapes preferably but not essentially ⅛ inch long by ⅛ inch diameter. This shape produces a tortuous path for the escaping gas assuring high conversion. The usual type of alumina catalyst has a pore size of 0.40cm 3/gm. and a surface area of 175m 2/gm. The catalyst is typically the acid type, the acidity of which is assayed by ammonia exchange in the usual manner. Typically, the amount of heavy metal present in the catalyst is neglegible and its sodium oxide content is less than 0.01%. The thermal conductivity is 0.40 Btu/hr ft°F. These characteristics are not essential but rather preferable.

The liquid L as it is metered from the liquid reservoir into the base of the reaction vessel 48 is first vaporized inside the reaction chamber 102 by the heating element 94 and as it passes upwardly decomposes by dehydration when the temperature of the catalyst is in the range of 250° C − 400° C. Preferably the temperature is maintained within the range of 300° C and 350° C within which the most desirable efficiency in producing ethylene, for instance, is achieved and minimum undesirable by-products result.

Figure 6:
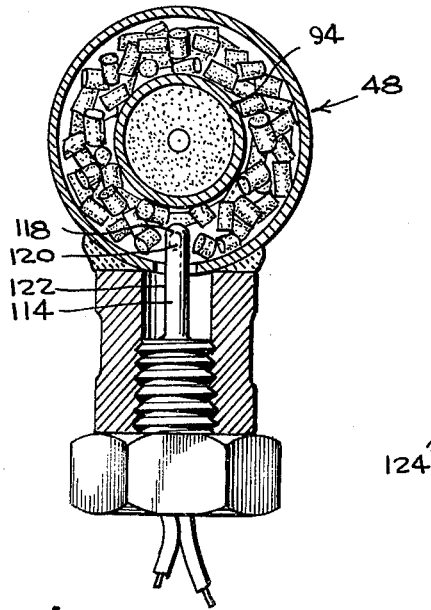
FIG. 6 is a cross-sectional view of the reaction vessel of FIG. 5 illustrating the position of the thermistor and the solid catalyst particles.
Figure 5:
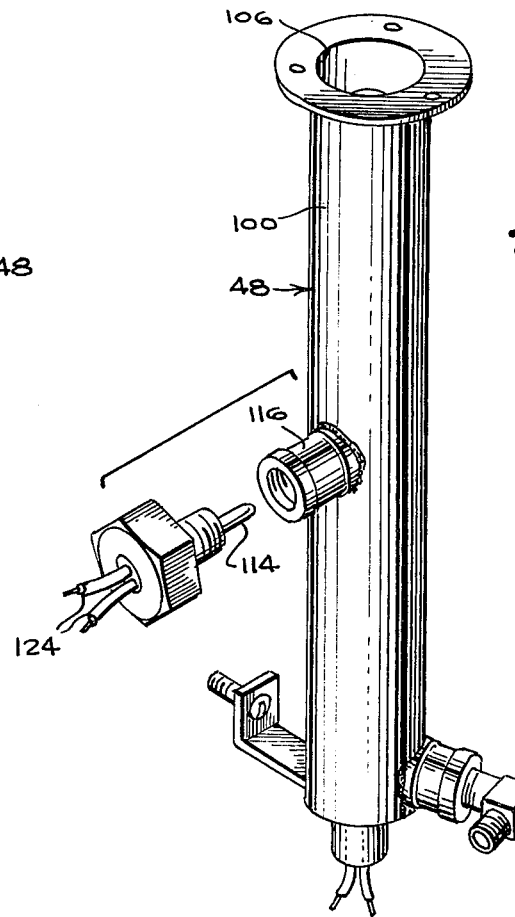
FIG. 5 is a perspective view of the reaction vessel in a disassembled condition from the thermistor.

In order to maintain the desired temperature range a thermistor 114, best shown in FIGS. 5 and 6, is fitted into a receptacle 116 secured to the outside of the jacket 100. It is desirable that the thermistor 114 is located within the reaction chamber 102 to sense the average temperature within the chamber. In order to achieve this result the thermistor is preferably positioned midway along the vertical length of the reaction chamber and, as best shown in FIG. 6, positioned to extend into approximately the midpoint 118 of the radial distance between the heating element 94 and the outer jacket 102. The thermistor 114 includes a probe 120 that is encased in a stainless steel tube 122 and connected to conducting wires 124 which are suitably covered as by fiberglass and refractory cement. The thermistor of the type described is commercially manufactured by the Fenwal Electronics Inc of Framingham, Mass.

ELECTRONIC TEMPERATURE CONTROLLER CIRCUIT

Figure 7:
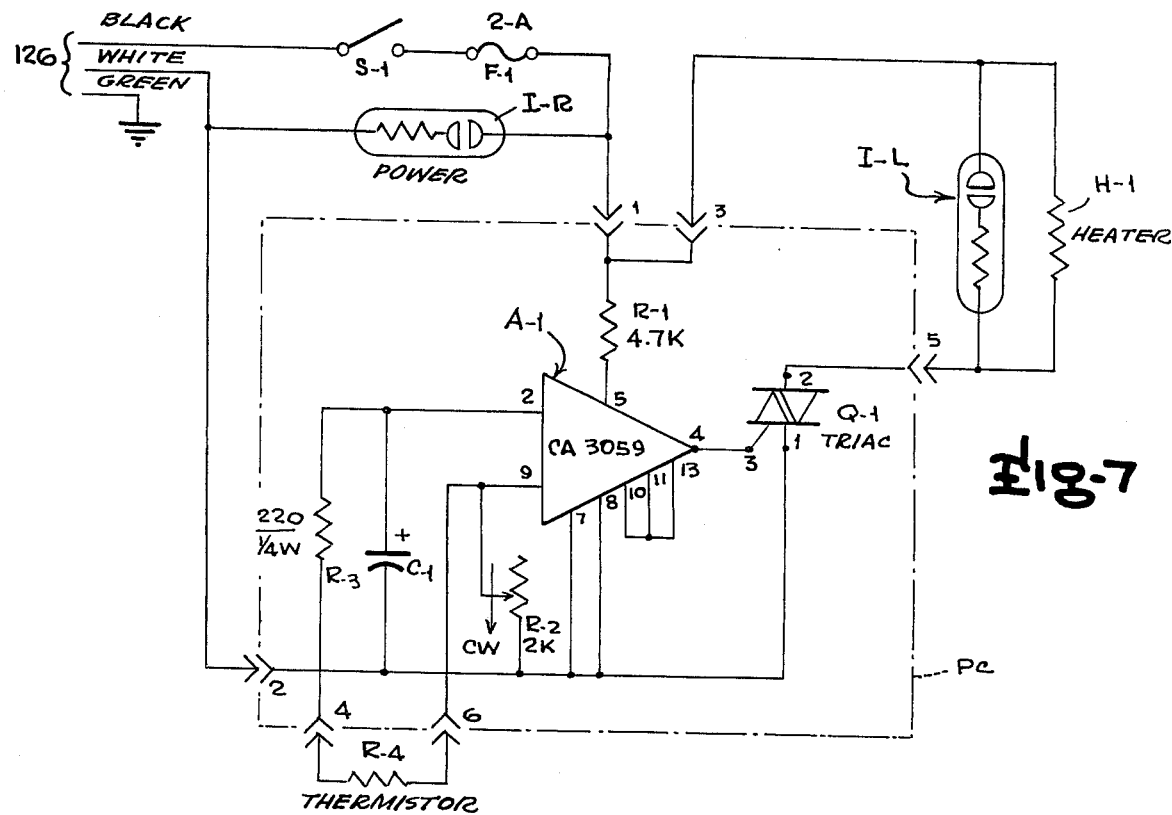
FIG. 7 is a schematic illustration of the electronic temperature controller.

Control of the temperature in the reaction chamber 102, which is heated by the electrically excited, resistive heating element H-1 (94) is achieved by electronic temperature controller circuit 98 shown in FIG. 4 and illustrated schematically in FIG. 7 and formed essentially of a solid state switch of the type commonly known as a "triac", which is controlled by a thermistor R-4 (1140 and an operational amplifier A-1 coupled so as to provide temperature stabilization by a feed-back loop. Referring to the schematic diagram, it will be observed that 117-volt AC nominal primary power 126 is applied through a three-prong plug, having, typically, green, white, and black leads. The green lead is connected to the generator case or chassis to provide electrical shock protection, and the white lead, which is the neutral line, is connected to the bottom of the red pilot lamp I-R and to pin No. 2 of the printed circuit PC indicated generally by the broken lines in FIG. 7 and in solid lines in FIG. 4. The black lead of the AC line is connected to the primary power switch S-1 and thence through the line fuse F-1 in tube 22 to pin No. 1 of the connector plug for the printed circuit PC and to the top of the red pilot lamp I-R. Power is applied from printed circuit connector pin 1 through resistor R-1, which may be a 4.7 K ohm 5-watt resistor, to pin No. 5 of the operational amplifier A-1. The operational amplifier A-1 is preferably a monolithic integrated circuit of a commercially available type, such as the RCA CA3059 zero-voltage switch, which is described in RCA Linear Integrated Circuit Application Notes ICAN-6158 and ICAN-6268. Pin No. 1 of the printed circuit connector is also connected to pin No. 3 of the printed circuit connector to provide a path for current to the top end of the yellow pilot lamp I-L and to the heating element H-1 in the reaction chamber. Pins 4 and 6 of the printed circuit connector are connected across the thermistor temperature sensor R-4 and pin No. 5 of the printed circuit is connected to the bottom of the yellow pilot lamp I-L and the heating element H-1. The various pins of the printed circuit referred to above may be the pins of a six-pin printed circuit mount connector of standard design.

The pins of the operational amplifier A-1 are connected as indicated in the schematic drawing, pin No. 9 being connected to the slider or movable contact of resistor R-2 (which is a 2-K ohm resistor), and to pin 6 of the printed circuit connector. Pins 7 and 8 are connected to the common lead connected to the bottom of resistor R-2 and one side of capacitor C-1, and to the printed circuit pin No. 2 and to the terminal 1 of the triac Q-1. Pin 4 of the operational amplifier is connected to the gate terminal 3 of the triac Q-1, pin 5 of the operational amplifier is connected to the bottom of resistor R-1, and terminal 2 of the triac Q-1 is connected to pin 5 of the printed circuit connector.

The large negative temperature coefficient of the thermistor R-4 is used to provide a feedback signal to the controller, since the thermistor probe is physically mounted within the thermal reaction chamber. Tracing the operation of the control circuit, when power in initially applied by closure of the switch S-1 and the reaction chamber is cold, AC power is applied to the operational amplifier A-1 through the current limiting resistor R-1 to pin 5 of the operational amplifier. This results in current emerging at pin 2 of the operational amplifier as a half-wave rectified voltage of approximately 6 volts which is filtered by the capacitor C-1 to provide a DC power source. The voltage $V_{cc}$ is applied to the series resistor combination of resistor R-3 and thermistor R-4, resistance of the latter when the reaction chamber is cold being at its highest value of about 1.5 M ohms. The temperature setting potentiometer R-2 is returned to common at pin 7 of the operational amplifier A-1. Due to the large ratio of the combination resistance R-3 and R-4 relative to the resistance R-2, the voltage at pin 9 of the operational amplifier is very near that of operational amplifier pin 7. Within the operational amplifier of A-1, there are two resistors used to divide the voltage $V_{cc}$ and to bias 1 of the amplifier inputs connected to pin 13 of the operational amplifier. This division sets the input at approximately one-half of voltage $V_{cc}$ or about three volts. As long as the voltage at pin 13 of the operational amplifier is more positive than the voltage at pin 9, the output voltage at pin 4 of the operational amplifier will be positive, biasing the gate terminal 3 of the triac Q-1 to close the circuit between the bottom of the heating element H-1 and the AC return.

The drive to the gate terminal 3 of triac Q-1 will be in the form of pulses coincident with the applied AC voltage crossing the zero axis, since the operational amplifier A-1 is also a zero-crossing detector. As the temperature of the reaction chamber is raised by the heater H-1, the resistance value of the thermistor R-1 decreases due to its temperature coefficient of resistance characteristics, and hence the potential at pin 9 of the operational amplifier is caused to increase. At some point, the resistance of the thermistor R-4 will be low enough that the corresponding voltage at pin 9 of the operational amplifier will become somewhat positive with respect to the voltage at pin 13. At this point, the drive pulses from pin 4 of the operational amplifier cease, turning off the triac Q-1 and interrupting the current through the heater H-1. The reaction chamber, and the thermistor R-4, then begin to cool until the potential at pin 9 of the operational amplifier is negative with respect to that at pin 13, at which time the triac Q-1 is again turned on and the cycle is repeated so long as primary power applied. The yellow pilot light I-L provides a visual indication of when the triac Q-1 is on and off. The temperature of the reaction chamber may be varied by adjustment of the temperature-setting potentiometer R-2; clockwise rotation increasing the temperature setting. The resistor R-3 is included to limit the amount of $V_{cc}$ current drawn by the thermistor R-4, since thermistor resistance may vary from unit to unit over a substantial range and thermistors that drop to a very low resistance of about 100 ohms or less would load the $V_{cc}$ voltage to the point that performance of the operational amplifier would not be completely predictable.

One convenient physical arrangement of the solid state components making up the electronic temperature controller on a printed circuit card with an aluminum heat sink, indicated by the reference character H-S is illustrated in FIG. 4, with the electronic components indicated by the same reference characters used in connection with the description of the schematic circuit.

LIQUID COMPOSITION

The liquid L that is to be poured into the liquid reservoir varies in accordance with the olefin produced. The principal ingredient of the liquid composition is a lower alkyl alcohol having up to 6 carbon atoms. For the purposes of the present invention and not by way of limitation the typical alcohol utilized for producing ethylene gas is ethanol.

In addition to the ethanol or other alcohol, a denaturing agent is added which may be one of the lower alkyl ketones containing not more than 10 total carbon atoms. Among such denaturing and activating agents are methyl isobutyl ketones, methyl ethyl ketone and acetone as well as other ketones. Also, useful as a denaturing agent and activating agent is a low molecular weight ester, of more than 10 carbon atoms, of a monocarboxylic acid having not more than 5 carbon atoms. Among these may be selected as typical the ethyl and amyl acetates. Other denaturing agents found useful include gasoline and gum rubber. The denaturing and activating agent should be present in an amount between 0.1 and 10% by volume of the total, preferably 6 to 8% and usually approximately 7%.

The generating liquid also includes a catalyst activating material in an amount between 1 and 10% by volume and includes one of the following: an ester having not greater than 10 carbon atoms of a monocarboxylic acid having not greater than 5 carbon atoms among which may be included amyl acetate and ethyl acetate; a straight chain hydrocarbon of not greater than 10 carbon atoms which may be saturated or unsaturated. Heptane and hexane are typically used; an aromatic hydrocarbon having a boiling point lower than 200° C such as cyclohexanone, methyl cyclohexanone, toluene, xylene, benzene, pyridine, chlorobenzene, ethylbenze, bromobenzene, etc.

The purpose of the catalyst activating agent is to dissolve out any accumulated organic condensation products which may be tar-like materials that limit the effectiveness of the catalyst by coating the surface of the catalyst during the conversion reaction.

A typical example of the liquid composition for the production of ethylene is ethanol 90% by volume, methyl isobutyl ketone 7% by volume and amyl acetate 3% by volume. In use, the liquid composition is then filtered in order to be devoid of particles greater than 5 micron size and poured into the liquid reservoir 46 to be fed by gravity through the needle valve 78 at 90 ml/hr into the reaction chamber where at a temperature between 300° – 350° C, the ethanol vaporizes by the action of the heating element 94. The vapor rises within the reaction chamber 102 and while in contact with the alumina catalyst is converted by dehydration into ethylene and water vapor which escape through the gas outlet port 40.

The gas generator apparatus is placed inside a ripening room to be used in ripening bananas or other climateric fruits.

The use of the gas generator apparatus is identical with respect to the generation of other olefinic gases as the use of ethylene merely typifies the broad scope of the invention.

I claim:

1. A gas generator apparatus comprising:
   a housing, said housing have a liquid supply source means positioned within and communicating with the interior of said housing,
   an access port in said housing to communicate with said supply source means,
   a liquid outlet in said supply source means,
   conduit means having one end connected to said liquid outlet,
   valve means connected to said outlet to meter the flow of the liquid from said supply source means,
   a reaction vessel positioned within said housing and having a reaction chamber with open and closed ends,
   an opening in said housing to communicate with said chamber open end to form a gas outlet,
   inlet means in said reaction vessel connected to the other end of said conduit means and positioned vertically lower than the supply source means liquid outlet to permit the liquid to gravity feed into said vessel,
   said reaction vessel having an outer jacket and an transversely adjacent electric heating element forming said reaction chamber transversely therebetween to receive said liquid,
   temperature control means to regulate the heat supplied by said heating element and maintain a preselected temperature within said reaction chamber, and
   a solid catalyst positioned within said chamber to catalyze the conversion of said liquid into said gas for movement out of said gas outlet.

2. The gas generator of claim 1 wherein said reaction chamber contains activated alumina as the catalyst.

3. The gas generator of claim 1 wherein said regulating means includes a temperature detecting probe being positioned within said chamber.

4. The gas generator of claim 1 wherein said reaction chamber and said solid catalyst form a tortuous path for said liquid upon vaporization.

5. The gas generator of claim 1 wherein said liquid reservoir includes an internal filter formed within said access port and depending into said reservoir.

6. The gas generator of claim 1 wherein said reaction vessel is vertically disposed to receive the gravity fed liquid for vaporization and passage of the vapor along the reaction chamber for catalytic conversion to said gas and exit through said gas outlet.

7. The gas generator of claim 1 wherein said reaction chamber contains activated alumina as the catalyst. Said regulating means includes a temperature detecting probe being positioned within said chamber and said reaction chamber and said solid catalyst form a tortuous path for said liquid upon vaporization. Said reaction vessel is vertically disposed to receive the gravity fed for vaporization and passage of the vapor along the reaction chamber for catalytic conversion to said gas and exit through said gas outlet. Said gas is ethylene and said liquid includes ethanol, a denaturing agent and a catalyst activating material.

8. An electronic temperature controller circuit for automatic control of temperature in the reaction chamber of claim 1, comprising an electrical resistance heating element communicating with the reaction chamber to heat the space therein, an operational amplifier having first and second input terminals, a triac solid state switch device having a gate terminal connected to the output of the operational amplifier and having a pair of terminals connected to the output of the operational amplifier and having a pair of terminals connected in series with said heating element across an AC voltage source for regulating current flow through the heating element, means connecting the operational amplifier to the AC voltage source to produce output control pulses for said gate responsive to the applied AC voltage crossing the zero axis, a manually adjustable potentiometer connected to said first input terminal of the operational amplifier to bias the same to cease production of said control pulses when the voltage at said first input terminal is below a selected level to causee said triac to stop current flow through the heating element, and a thermistor responsive to temperature in the reaction chamber and connected across said input terminals of said operational amplifier providing a temperature stabilization feedback loop to vary the voltage applied to said first input terminal in selected relation to temperature variations in the reaction chamber for enabling and disabling the operational amplifier to produce said control pulses and thereby maintain a selected temperature in the reaction chamber.

9. The gas generator of claim 1 wherein said reaction chamber is vertically disposed within said housing.

10. The gas generator of claim 1 wherein the inlet means for the liquid into the reaction vessel is positioned adjacent the bottom of the reaction chamber.

11. The gas generator of claim 1 wherein said open end of said chamber is located approximately at the top of said chamber.

12. The gas generator of claim 1 wherein said opening on said housing is positioned on the top of the housing.

13. The gas generator of claim 1 wherein said open end of said chamber is located approximately at the top of said chamber and said opening on said housing is positioned on the top of the housing.

14. The gas generator of claim 1 wherein said reaction chamber is annular in cross-section.

15. The gas generator of claim 1 wherein said heating element has a voltage distribution of $P=40-5X$, where X is the distance in inches along the heating element from the electrical input.

16. The gas generator of claim 1 wherein said reaction chamber is vertically disposed within said housing and said reaction chamber is annular in cross-section.

17. The gas generator of claim 1 wherein said reaction chamber is vertically disposed within said housing, the inlet means for the liquid into the reaction vessel is positioned adjacent the bottom of the reaction chamber and said reaction chamber is annular in cross-section.

18. The gas generator of claim 1 wherein said reaction chamber is vertically disposed within said housing, the inlet means for the liquid into the reaction vessel is positioned adjacent the bottom of the reaction chamber, said open end of said chamber is located approximately at the top of said chamber, said opening on said housing is positioned on the top of the housing and said reaction chamber is annular in cross-section.

19. The gas generator of claim 1 wherein said reaction chamber is vertically disposed within said housing, the inlet means for the liquid into the reaction vessel is positioned adjacent the bottom the reaction chamber, said open end of said chamber is located approximately at the top of said chamber, said opening on said housing is positioned on the top of the housing, said reaction chamber is annular in cross-section and said heating element has a voltage distribution of $P=40-5X$, where $X$ is in the distance inches along the heating element from the electrical input.

20. The gas generator of claim 1 wherein said reaction chamber is vertically disposed within said housing, said reaction chamber is annular in cross-section said heating element has a voltage distribution of $P=40-5X$, where $X$ is in the distance inches along the heating element from the electrical input.

* * * * *